United States Patent [19]
Kurita et al.

[11] Patent Number: 5,290,497
[45] Date of Patent: Mar. 1, 1994

[54] PROCESS FOR PRODUCING MOLDED ARTICLES OF POLYIMIDE PRECURSOR

[75] Inventors: Mitsuo Kurita, Chiba; Kazutsune Kikuta, Ichihara; Keizo Oka, Chiba, all of Japan

[73] Assignee: Chisso Corporation, Osaka, Japan

[21] Appl. No.: 969,976

[22] Filed: Nov. 2, 1992

[30] Foreign Application Priority Data

Nov. 8, 1991 [JP] Japan .................................. 3-319585
Nov. 13, 1991 [JP] Japan .................................. 3-324003

[51] Int. Cl.$^5$ .............................................. B29C 47/78
[52] U.S. Cl. .......................... 264/176.1; 264/331.12; 264/331.19; 264/347
[58] Field of Search ............... 264/176.1, 331.19, 347, 264/211.12, 204, 331.12

[56] References Cited

U.S. PATENT DOCUMENTS

| | | | |
|---|---|---|---|
| 3,502,762 | 3/1970 | Haller | 264/204 |
| 3,575,924 | 4/1971 | Bargain | 264/331.19 |
| 3,708,459 | 1/1973 | Lubowitz | 264/331.19 |
| 3,891,601 | 6/1975 | Peterson et al. | 260/47 |
| 4,302,413 | 11/1981 | Howe et al. | 264/126 |
| 4,474,662 | 10/1984 | Makino et al. | 264/41 |
| 4,624,981 | 11/1986 | Zecher et al. | 264/204 |
| 4,628,079 | 12/1986 | Zecher et al. | 264/204 |
| 5,069,848 | 12/1991 | Saruwatari et al. | 264/331.19 |
| 5,126,085 | 6/1992 | Thorp et al. | 264/126 |

FOREIGN PATENT DOCUMENTS

| | | | |
|---|---|---|---|
| 2440960 | 11/1979 | France. | |
| 62-42045 | 9/1987 | Japan. | |
| 62-56180 | 11/1987 | Japan. | |
| 63-176141 | 7/1988 | Japan. | |
| 63-243321 | 10/1988 | Japan. | |
| 63-305137 | 12/1988 | Japan | 264/216 |
| 1-99616 | 4/1989 | Japan. | |
| 2-169019 | 6/1990 | Japan. | |
| 3-47727 | 2/1991 | Japan. | |
| 2070726A | 9/1981 | United Kingdom | 264/204 |

*Primary Examiner*—Jeffery Thurlow
*Attorney, Agent, or Firm*—Leydig, Voit & Mayer

[57] ABSTRACT

The present invention provides a process for producing molded articles of a polyimide precursor by a use of a usual extrusion technique, and physical properties of polyimide products prepared by the heat treatment of the molded articles of the polyimide precursor at 400° C. are excellent. This process is characterized by drying a solid obtained by pouring a dilute solution of a polyimide precursor including an aromatic tetracarboxylic acid component and an aromatic diamine component 1 into a liquid in which the precursor is only poorly soluble to obtain a dry solid having a polyimide precursor concentration of 50–70% by weight, and then extruding this dry solid at 80°–130° C.

14 Claims, No Drawings

PROCESS FOR PRODUCING MOLDED ARTICLES OF POLYIMIDE PRECURSOR

BACKGROUND OF THE INVENTION

1. Field of the Invention

The present invention relates to a process for producing molded articles of a polyimide precursor from which there can be obtained molded articles of polyimide having excellent heat-resistance by carrying out a heat treatment.

More specifically, the present invention relates to a process for producing molded articles of a polyimide precursor which is scarcely imidated and which has self-shape retention properties for inhibiting fluidization at room temperature.

2. Description of the Related Art

Polyimides have excellent heat resistance, chemical resistance, mechanical properties and electrical properties. Polyimide films can usually be produced by applying a solution containing 8 to 30% of a polyamic acid (a polyimide precursor or PAA) in a fluid state to a support by casting or by the use of a T-die; drying the solution by hot air or the like to obtain fluidity-free PAA films having self-shape retention properties; and then further heating the films up to about 400° C. to produce the polyimide films. For example, as the polyimide films, there is a trade name "Capton" made by Du Pont.

However, since these polyimide films are manufactured by a solution casting process, productivity is poor and cost is high. On the other hand, in order to improve the productivity, there is a process which comprises completely removing a solvent; melting and extruding a pelletized thermoplastic polyimide at a high temperature (e.g., 400° C.); and then cooling the extruded articles to produce the films (e.g., Japanese Patent Application Laid-open No.Hei-3-42224).

The thus produced thermoplastic polyimide films, since being thermoplastic, has poorer heat resistance as compared with a thermosetting polyimide obtained by curing a polyimide precursor.

Japanese Patent Application Laid-open No.Sho-63-243321 has disclosed a method which comprises the steps of obtaining a polyimide precursor as a polyamic acid ester by solution polymerization, concentrating or isolating it under reduced pressure, adjusting the concentration of the ester to 30–80% by weight, heating/dissolving, extruding, cooling it to obtain molded articles, and then heating them at a high temperature (300° C. or more) to obtain polyimide molded articles.

However, this method requires the concentration of the precursor, and so the reaction of esterifying an aromatic tetracarboxylic acid is necessary. In consequence, the process is complex. Additionally, in this method, N-methylpyrrolidone having a high viscosity and a high boiling point (204° C.) is used as a solvent, and therefore a long period of time is required to merely concentrate PAA under reduced pressure, so that yield is poor.

SUMMARY OF THE INVENTION

An object of the present invention is to solve the above-mentioned problems of conventional techniques, i.e., to provide a process for producing molded articles of a precursor itself through simple steps usually without requiring a reaction of esterifying a polyimide precursor.

The present inventors have intensively investigated the above-mentioned problems, and as a result, they have found that the above-mentioned object can be achieved by extruding a solid obtained by pouring a dilute solution of a polyimide precursor in a liquid in which the precursor is only poorly soluble. In consequence, the present invention has been completed. That is, a process for producing molded articles of a polyimide precursor according to the present invention is characterized by drying a solid obtained by pouring a dilute solution of a polyimide precursor comprising an aromatic tetracarboxylic acid component and an aromatic diamine component in a poor solvent to obtain a dry solid having a polyimide precursor concentration of 50–70% by weight, and then extruding this dry solid at 80°–130° C.

DETAILED DESCRIPTION OF PREFERRED EMBODIMENTS

A polyimide precursor (c) which can be used in a preparation process of the present invention can be obtained by reacting an aromatic tetracarboxylic dianhydride or its derivative (a) with an aromatic diamine (b) in an equimolar ratio, as represented by the equation:

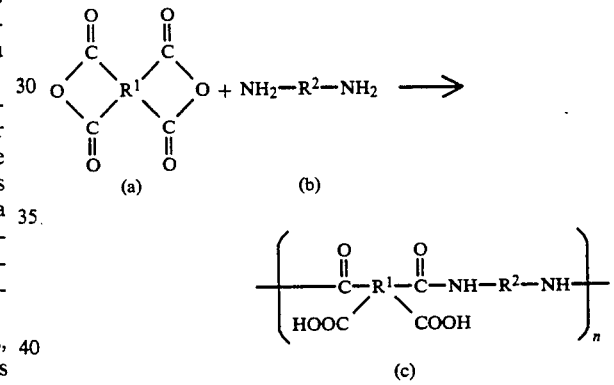

wherein each of $R^1$ and $R^2$ is an aromatic group, and n is the number of repeating units which show a viscosity of 300 to 4000 poise (a 15% dimethylacetamide solution).

Typical examples of the above-mentioned aromatic tetracarboxylic dianhydride include pyromellitic dianhydride, 3,3',4,4'-benzophenone-tetracarboxylic dianhydride, 3,3',4,4'-biphenyl-tetracarboxylic dianhydride, 2,3,3',4'-biphenyl-tetracarboxylic dianhydride, 2,3,6,7-naphthalenetetracarboxylic dianhydride, 1,2,5,6-naphthalenecarboxylic dianhydride, 1,4,5,8-naphthalenetetracarboxylic dianhydride, 2,2'-bis(3,4-dicarboxyphenyl)propane dianhydride and bis(3,4-dicarboxyphenyl) sulfone dianhydride.

Furthermore, typical examples of the aromatic diamine include 4,4'-diaminophenyl ether, 4,4'-diaminodiphenylmethane, 3,3'-diaminodiphenylmethane, para-phenylenediamine, methaphenylenediamine, benzidine, 3,3'-dimethylbenzidine, 3,3'-dimethoxybenzidine, 4,4'-diaminodiphenylsulfone, 4,4'-diaminodiphenyl sulfide, 4,4'-diaminodiphenylpropane and 2,2'-bis[4-(4-aminophenoxy)phenyl]propane.

In the production process of the present invention, the concentration of a dilute solution of the polyimide precursor is from 5 to 50% by weight, usually from 5 to 30% by weight, preferably from 10 to 20% by weight.

When the concentration of the dilute solution is more than 50% by weight, the solution loses fluidity at ordinary temperature, so that it has no adhesive properties any more and becomes unpreferably tack-free.

The dilute solution of the polyimide precursor can be prepared by reacting a substantially equimolar mixture of the aromatic tetracarboxylic dianhydride and the aromatic diamine at a reaction temperature of 80° C. or less, preferably 5°-50° C. for a reaction time of about 2-10 hours in an organic polar solvent.

Typical examples of the organic polar solvent which can be used in the present invention include N-methyl-2-pyrrolidone, dimethylacetamide, dimethylformamide, dimethyl sulfoxide and hexamethylene phosphorus triamide. Each organic polar solvent can be mixed with any of phenols such as cresol, phenol and xylenol, hexane, benzene and toluene.

Examples of a bad solvent which is a poor solvent (that is, a liquid in which the polyimide precursor is only poorly soluble) that can be used in the production process of the present invention include ethanol, methanol, acetone, benzene, toluene, xylene, ethyl ether, ethyl acetate and mixed solvents of two or more thereof. The amount of the poor solvent is from 1 to 30 parts by weight per part by weight of the polyimide precursor solution, or from 8 to 20 moles, preferably from 8 to 15 moles, per mole of the polyimide precursor solution. The poor solvent may be used in an amount in excess of the above-mentioned range, but the above-mentioned range is preferable in view of a post-treatment and an economical standpoint.

It is preferred that the separation method of the solid by pouring the dilute solution of the polyimide precursor in the poor solvent is carried out in such a manner that the solvent of the solution is dissolved in the poor solvent. For example, the dilute solution of the polyimide precursor is slowly added to the poor solvent, while the resulting solution is vigorously stirred by a mixer or the like, to form a flake-like or powdery solid, and afterward the solvent is removed by a centrifugal separator or the like and the resultant flake-like solid is then taken out.

This flake solid is dried so that the concentration of the polyimide precursor may be in the range of 50-70% by weight, but this operation is accomplished by drying the flake-like solid in a nitrogen atmosphere under reduced pressure for 240 minutes. The temperature for this drying operation depends upon the kind of solvent to be used, but it is usually 130° C. or less, preferably 50° C. or less.

When the concentration of the polyimide precursor in the dry solid is less than 50% by weight, the solid is overly viscous. Conversely, when it is in excess of 70% by weight, a high temperature of 130° C. or more is required in the extrusion step, so that imidation is accelerated and the extruded material becomes non-uniform.

In the production process of the present invention, the extrusion is carried out by extruding the dry solid at 80°-130° C. by the use of an extruder. In general, as the extruder, there can be used a single-screw or a twin-screw extruder, preferably having a vent function for removing low-temperature volatilizable components.

A heating residence time in the extruder is preferably a short time within 5 minutes at 80°-130° C. so as to control the imidation, and within this time, the imidation scarcely proceeds. When the residence time is less than 5 minutes at less than 80° C., the surfaces of molded articles are non-uniform and become coarse and rough.

Conversely, when the extrusion is carried out at a temperature more than 130° C., the imidation proceeds partially, and some polymer at the corner of the exit of the extruder becomes attached to the surfaces of the molded articles.

The production process of the present invention permits simply obtaining molded articles such as films of the scarcely polyimidated polyimide precursor, i.e., the polyamic acid itself without a reaction such as esterification of the polyimide precursor. Since molding can be achieved by a usual extrusion, the process is simple and yield is also good.

In addition, the products prepared by the heat treatment of the obtained molded articles of the polyimide precursor at 400° C., that is, the polyimidated molded articles are excellent in physical properties.

EXAMPLES

Next, the present invention will be described with reference to examples and comparative examples.

The concentration of a polyimide precursor in a dry solid was calculated by the following formula:

$$\frac{\text{weight of the dry solid after heat treatment at 400° C.}}{\text{weight of the dry solid} \times 0.91} \times 100$$

The moldability of the molded articles (films) of the polyimide precursor was visually evaluated on the basis of presence or absence of unevenness, coarseness and sticking properties on the surfaces of the molded articles.

The self-shape retention properties of the molded articles (films) of the polyimide precursor were evaluated by observing the shape of the films at ordinary temperature.

The physical properties of the molded articles (films) of the polyimide precursor were evaluated as follows: Each film was set in a stainless steel frame and then fixed thereto along its four sides, and afterward it was subjected to a heat treatment at 400° C. to obtain a polyimide film. Samples having a width of 10 mm and a thickness of about 50 μm were made from the thus obtained polyimide film, and the physical properties were then measured at a temperature of 25° C. at a tensile rate of 50 mm/minute by means of a R-II type strograph made by Toyo Seiki Co., Ltd.

EXAMPLE 1

15 parts by weight of an equimolar mixture of 3,3',4,4'-biphenyltetracarboxylic dianhydride represented by the formula

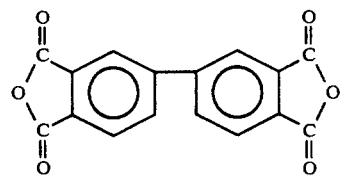

paraphenylenediamine represented by the formula

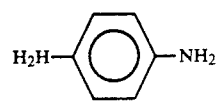

were mixed with 85 parts by weight of N,N-dimethylacetamide (hereinafter abbreviated to "DMAC"), and the mixture was then reacted at a temperature of 10° C. for 8 hours to obtain a polyamic acid solution (hereinafter referred to as "polyimide precursor solution" or "PAA solution") having a solution viscosity of 500 poise (which was a value measured by a rotaviscometer at 25° C.).

36.0 parts by weight of ethanol as a poor solvent were placed in a Henschel mixer, and 10 parts by weight of the above-mentioned polyimide precursor solution were added to the solvent with stirring. The solution was continuously stirred at 30° C. for 30 minutes, and then subjected to centrifugal separation to remove the solvent, thereby separating the resultant solid.

This solid was allowed to stand at 40° C. under a nitrogen atmosphere under reduced pressure for 120 minutes to remove ethanol, followed by drying. The concentration of the polyimide precursor in the obtained dry solid was 55% by weight (Table 1).

This dry solid was extruded by an extruder having a diameter of 20 mm and equipped with a T-die having a width of 100 mm and a lip clearance of 0.5 mm to obtain molded articles of the polyimide precursor (hereinafter referred to as "PAA molded articles") in the form of films. In this case, temperatures of a flake delivery portion, a compression portion, an extrusion portion and the T-die were 80° C., 100° C., 100° C. and 100° C., respectively.

This film was set in a stainless steel frame and then fixed along its four sides, and it was subjected to a heat treatment at 400° C. to obtain a polyimide film. Physical properties of this film are set forth in Table 2.

EXAMPLES 2 to 11

The same procedure as in Example 1 was repeated except that the concentration of a polyimide precursor in a dry solid and the kind and the amount of poor solvent were changed as in Table 1.

COMPARATIVE EXAMPLE 1

The same procedure as in Example 1 was repeated except that the 36.0 parts by weight of ethanol were replaced with 82.1 parts by weight of N-hexane. DMAc scarcely migrated to an n-hexane portion, so that it was dispersed in a sticky gelatinous condition.

COMPARATIVE EXAMPLES 2 and 3

The same procedure as in Example 2 was repeated except that outlet temperatures of the extruder were changed as in Table 2.

TABLE 1

|  | PAA Solution*1 | Poor Solvent | | | Dry Solid |
|---|---|---|---|---|---|
|  | Parts by Weight | Kind | Parts by Weight | Mixed Molar Ratio*2 (to DMAc) | concentration of PAA (% by weight) |
| Example 1 | 10 | Ethanol | 36.0 | 8 | 55 |
| Example 2 | 10 | Ethanol | 44.9 | 10 | 63 |
| Example 3 | 10 | Methanol | 29.4 | 8 | 57 |
| Example 4 | 10 | Methanol | 67.3 | 16 | 65 |
| Example 5 | 10 | Methanol & Ethanol (2:1) | 35.8 | 10 | 64 |
| Example 6 | 10 | Acetone | 56.7 | 10 | 61 |
| Example 7 | 10 | Ethyl Acetate | 86.0 | 10 | 60 |
| Example 8 | 10 | Benzene | 76.2 | 10 | 61 |
| Example 9 | 10 | Toluene | 89.9 | 10 | 60 |
| Example 10 | 10 | Xylene | 104 | 10 | 60 |
| Example 11 | 10 | Ethyl Ether | 72.3 | 10 | 62 |
| Comp. Ex. 1 | 10 | n-hexane | 82.1 | 10 | 18 |
| Comp. Ex. 2 | 10 | Ethanol | 44.9 | 10 | 63 |
| Comp. Ex. 3 | 10 | Ethanol | 44.9 | 10 | 63 |

*1 A 15% solution of PAA in a DMAC solvent.
*2 DMAC:N,N-dimethylacetamide.

TABLE 2

| | PAA Molded Articles | | | | |
|---|---|---|---|---|---|
| | Extrusion | | | | Self |
| | | Moldability | | | Shape |
| | Outlet Temp. | Surface | | Stick | Retention |
| | (°C.) | Unevenness | Coarseness | | |
| Example 1 | 100 | None | None | None | Present |
| Example 2 | 100 | None | None | None | Present |
| Example 3 | 100 | None | None | None | Present |
| Example 4 | 100 | None | None | None | Present |
| Example 5 | 100 | None | None | None | Present |
| Example 6 | 100 | None | None | None | Present |
| Example 7 | 100 | None | None | None | Present |
| Example 8 | 100 | None | None | None | Present |
| Example 9 | 100 | None | None | None | Present |
| Example 10 | 100 | None | None | None | Present |
| Example 11 | 100 | None | None | None | Present |
| Comp. Ex. 1 | — | — | — | — | — |
| Comp. Ex. 2 | 140 | Present | Present | None | Present |
| Comp. Ex. 3 | 70 | Present | Present | Present | Present |

Articles* obtained by heat treatment of PAA Molded Articles at 400° C.

| Physical Properties | | |
|---|---|---|
| Tensile Strength | Tensile Elongation | Elasticisty Modulus |

TABLE 2-continued

|  | kg/mm² | % | kg/mm² |
|---|---|---|---|
| Example 1 | 23 | 24 | 470 |
| Example 2 | 21 | 22 | 400 |
| Example 3 | 24 | 25 | 420 |
| Example 4 | 23 | 23 | 450 |
| Example 5 | 23 | 24 | 460 |
| Example 6 | 25 | 25 | 430 |
| Example 7 | 22 | 24 | 410 |
| Example 8 | 24 | 23 | 440 |
| Example 9 | 23 | 25 | 450 |
| Example 10 | 25 | 24 | 480 |
| Example 11 | 22 | 22 | 440 |
| Comp. Ex. 1 | — | — | — |
| Comp. Ex. 2 | 20 | 11 | 440 |
| Comp. Ex. 3 | 19 | 12 | 450 |

*Polyimide film.

What is claimed is:

1. A process for producing molded articles of a polyimide precursor comprising drying a solid obtained by pouring a dilute solution of a polyimide precursor derived from an aromatic tetracarboxylic acid component and an aromatic diamine component in a liquid in which said polyimide precursor is only poorly soluble to obtain a dry solid having a polyamide precursor concentration of 50 to 70% by weight, and then extruding this dry solid at 80° to 130° C.

2. The process for producing molded articles of a polyimide precursor according to claim 1 wherein the aromatic tetracarboxylic acid component is a compound represented by the formula (a)

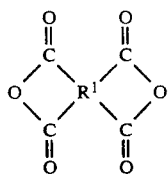

(a)

and the aromatic diamine component is a compound represented by the formula (b)

NH₂—R²—NH₂         (b)

wherein each of R¹ and R² is an aromatic group.

3. The process for producing molded articles of a polyimide precursor according to claim 1, wherein the concentration of the dilute solution of the polyimide precursor is in the range of 5 to 50% by weight, and the amount of the liquid in which said polyimide precursor is only poorly soluble is in the range of 1 to 30 parts by weight per part by weight of the polyimide precursor solution.

4. The process for producing molded articles of a polyimide precursor according to claim 1 wherein said polyimide precursor is represented by the formula:

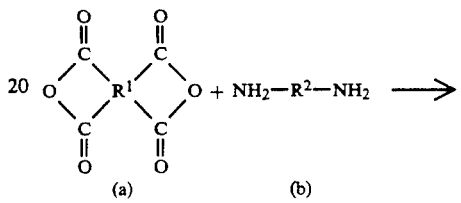

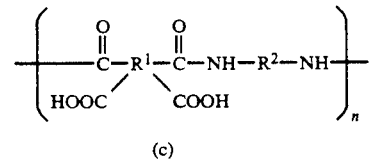

wherein each of R¹ and R² is an aromatic group and n is the number of repeating units which show a viscosity of 300 to 4000 poise (in a 15% dimethylacetamide solution).

5. The process for producing molded articles of a polyimide precursor according to claim 1 wherein said tetracarboxylic acid component comprises 3,3', 4,4'-biphenyltetracarboxylic dianhydride.

6. The process for producing molded articles of a polyimide precursor according to claim 1 wherein said diamine comprises para-phenylenediamine.

7. The process for producing molded articles of a polyimide precursor according to claim 3 wherein the concentration of the dilute solution of the polyimide precursor is from 10 to 30% by weight.

8. The process for producing molded articles of a polyimide precursor according to claim 1 wherein said liquid is ethanol.

9. The process for producing molded articles of a polyimide precursor according to claim 1 wherein said liquid is methanol.

10. The process for producing molded articles of a polyimide precursor according to claim 1 wherein said liquid is acetone.

11. The process for producing molded articles of a polyimide precursor according to claim 1 wherein said liquid is ethyl acetate.

12. The process for producing molded articles of a polyimide precursor according to claim 1 wherein said liquid is benzene.

13. The process for producing molded articles of a polyimide precursor according to claim 1 wherein said liquid is toluene.

14. The process for producing molded articles of a polyimide precursor according to claim 1 wherein said liquid is xylene.

* * * * *